United States Patent [19]
Clifford et al.

[11] 4,056,743
[45] Nov. 1, 1977

[54] OSCILLATING REED ELECTRIC MOTORS

[75] Inventors: Cecil Frank Clifford; Laurence Harry Finlayson, both of Bath, England

[73] Assignee: Horstmann Clifford Magnetics Ltd., Somerset, England

[21] Appl. No.: 629,611

[22] Filed: Nov. 6, 1975

Related U.S. Application Data

[63] Continuation-in-part of Ser. No. 492,176, July 26, 1974, abandoned.

[30] Foreign Application Priority Data

July 30, 1973 United Kingdom ............... 36232/73
Aug. 31, 1973 United Kingdom ............... 41131/73

[51] Int. Cl.² .......................................... H02K 33/00
[52] U.S. Cl. ..................................... 310/21; 310/25; 310/330
[58] Field of Search ................. 310/8.2, 8.3, 8.5, 8.6, 310/8.1, 21, 22, 25; 74/126; 318/154; 58/23 TF, 23 A, 23 V, 23 AC

[56] References Cited

U.S. PATENT DOCUMENTS

| | | | |
|---|---|---|---|
| 3,148,497 | 9/1964 | Clifford et al. | 310/21 X |
| 3,433,009 | 3/1969 | Haag | 58/23 TF |
| 3,694,681 | 9/1972 | Horstmann et al. | 310/8.3 |
| 3,699,762 | 10/1972 | Zatsky | 58/23 AC |
| 3,737,746 | 6/1973 | Cielaszyk et al. | 58/23 AC |
| 3,791,133 | 2/1974 | Hashimura et al. | 310/8.9 |

*Primary Examiner*—Mark O. Budd
*Attorney, Agent, or Firm*—Emory L. Groff, Jr.

[57] ABSTRACT

An electric motor of the kind in which an oscillating element carries a magnet which is coupled magnetically to a rotor to transmit drive thereto. The electrical driving signals for the oscillating element, derived for example from a divided-down quartz crystal oscillator, have a frequency $f$ which is $f/2Q$ less than the natural resonant frequency of the oscillating element, where $Q$ is the $Q$ factor of the element, to maintain drive of the latter for all variations in natural frequency due to ambient changes.

13 Claims, 4 Drawing Figures

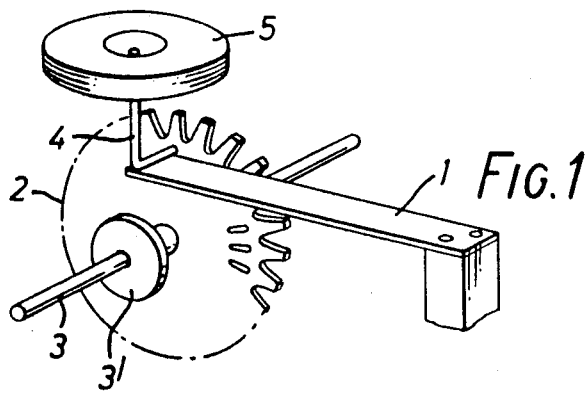
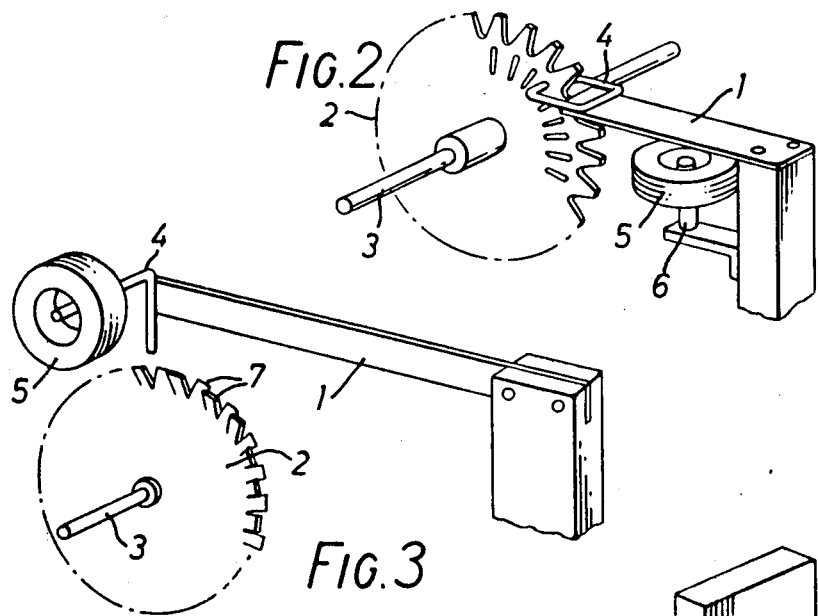
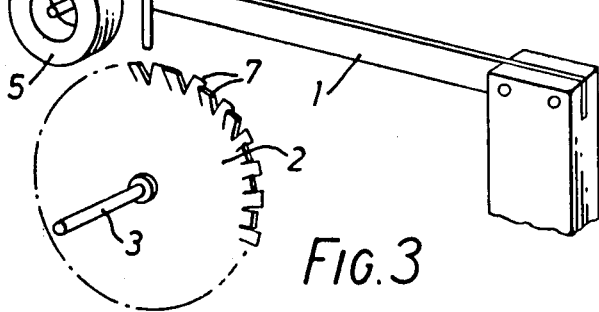
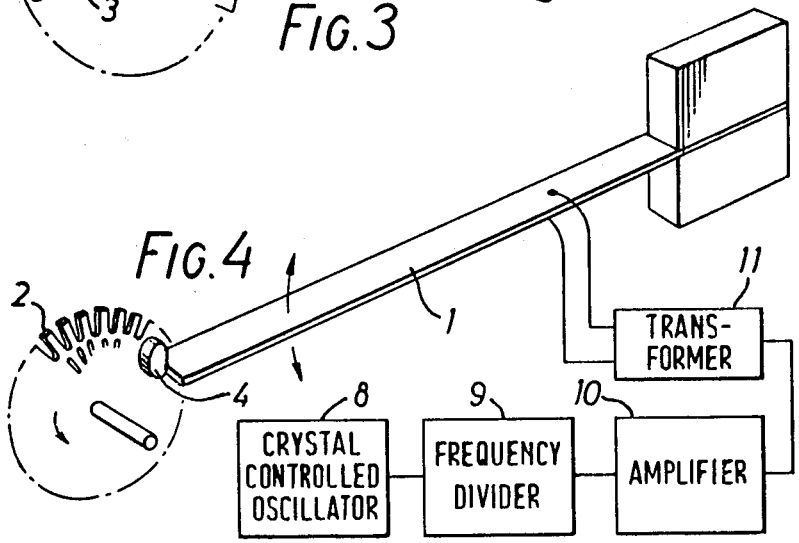

OSCILLATING REED ELECTRIC MOTORS

This application is a continuation-in-part of application Ser. No. 492,176, filed July 26, 1974, now abandoned.

BACKGROUND OF THE INVENTION

This invention relates to electric motors, and more particularly to motors of the kind in which an oscillatory element transmits drive to a rotor through a magnetic coupling.

Known electric motors of this kind have been known to employ an electromagnetic driving means to maintain the oscillatory element in oscillation and thereby impart continuous rotation to the rotor. In order to ensure that the rotational speed of the rotor is accurately determined, for example when the motor is used in a timepiece drive, it is important to maintain the electrical driving signals at a constant accurately determined frequency.

The present invention aims to provide an improved electric motor of simplified construction and higher efficiency.

SUMMARY OF THE INVENTION

According to one aspect of the present invention there is provided an electric motor comprising a mechanically oscillatory element, a magnetic coupling cooperating with the oscillatory element, a rotor cooperating with the oscillatory element through the magnetic coupling to be driven thereby, driving signal generating means providing electrical driving signals having a frequency $f$ which is substantially $f/2Q$ less than the natural resonant frequency of the oscillatory element, that is, the frequency corresponding to maximum oscillation amplitude, where Q is the Q-factor of the oscillatory element, and drive means to which said driving signals are applied, said drive means cooperating with said oscillatory element to effect oscillation of the latter and cause, through the magnetic coupling, rotation of the rotor in response to said driving signals.

Preferably the electrical driving signals comprise divided down output signals from a quartz crystal or other controlled oscillator. The frequency of the said oscillator, which may be at least 5 KHz, and the factor of frequency division would be selected according to the natural resonant frequency of the oscillatory element. It will be noted that in this case the driving signals are not merely synchronised to the piezo-electric crystal oscillations, but are actually derived from the piezo-electric crystal oscillations, so that the piezo-electric crystal serves as the source of driving signals.

Preferably the oscillatory element is a cantilever-element and is anchored or fixed at one end, the magnetic coupling being afforded by a magnetic member or members carried at the free end of the oscillatory element and cooperating with a circumferential wavy magnetic track or flux path on the rotor. Thus the magnetic member or at least one of the magnetic members at the free end of the oscillatory element may have one pole cooperating with the rotor and another pole cooperating with a driving coil to which the electrical signals are applied to drive the oscillatory element. Alternatively, the oscillatory element may be driven electromagnetically by a solenoid cooperating with a part of the element intermediate the ends of the latter, the said electrical signals being applied to the driving coil.

In an advantageous practical embodiment of the invention the magnetic member comprises a permanent magnet carried at the free end of the oscillatory element, the length of the permanent magnet being less than six times the amplitude of oscillation of the magnet upon oscillation of the cantilever element. Preferably the cross sectional area of the said magnet exceeds the square of it length for optimum efficiency.

The rotor employed in the motor of the present invention may be of any suitable type, and the circumferential wavy magnetic track or flux path would in practice be selected from existing known types of rotors according to the desired moment of inertia of the rotor and the direction of oscillation of the cooperating free end of the oscillatory element relative to the axis of the rotor. If, for example, the free end of the oscillatory element oscillates in a direction parallel to the axis of the rotor, then the rotor may be provided with a wavy periphery with undulations in a direction parallel to the rotor axis, as known per se. Alternatively, the rotor may be of the spoked variety, in which alternate spokes around the periphery of the rotor are bent in opposite directions from a median plane perpendicular to the axis of the rotor to define, in effect, an undulating flux path in the form of an air gap between the outer tips of the rotor spokes. Where the free end of the oscillatory element oscillates in a direction perpendicular to the axis of the rotor, the latter may be provided on one or both faces with a wavy circumferential magnetic track, for example a magnetic track defined between inner and outer sets of radial spokes angularly displaced with respect to one another so that the inner spokes are aligned with the gaps between the outer spokes.

This type of spoked rotor has a smaller moment of inertia than rotors of the same dimensions formed from a solid disc of magnetic material with a continuous peripheral undulation. The spoked rotor also has the advantage of exhibiting fewer eddy current losses due to the physical separation of the individual spokes of the rotor. Consequently when using a spoked rotor of this type the motor according to the invention may be self-starting at higher frequencies than the 'solid' type of rotor.

Although the oscillatory element may be driven electromagnetically as described above, practical embodiments of the invention are also envisaged in which the element is driven piezo-electrically. Thus the oscillatory element may comprise or include piezo-electric bender element to which the driving signals are applied to induce flexural oscillations of the element. The oscillatory element may be constituted by an elongate piezo-electric bender element of 'multimorph' construction comprising a single piece of ceramic bender material with multiple conductors extending longitudinally therethrough.

According therefore to another aspect of the present invention there is provided a piezo-electric motor comprising a cantilever-mounted piezo-electric bender element supported at one end and carrying at its other end at least one driving element of magnetic material, a rotor of magnetic material cooperating with the driving element such that upon oscillation of the bender element at its natural frequency the rotor is caused to rotate, and means for applying to the bender element an alternating driving signal at a frequency such as to cause resonant oscillations of the bender element.

The invention is applicable to mains-driven motors, in which case the alternating driving signal applied to the bender element may be derived direct from an alternating current mains supply, providing the frequency is accurately controlled, thus affording a low cost synchronous motor. Alternatively, for a precision electric motor in a timepiece drive, for example in a clock, watch or timeswitch, the means for applying the drive voltage may include a piezo-electric crystal, for example, a quartz crystal, controlled timekeeping oscillator.

Suitable frequency dividing and amplifier means would in practice be interposed between the timekeeping oscillator and the piezo-electric bender element.

Certain practical advantages derive from the use in the present invention of a piezo-electric bender element having a "multimorph" construction comprising a single piece of ceramic bender material with multiple conductors extending longitudinally therethrough and forming in the material a number of different zones. The "multimorph" element has electrodes, usually of silver, deposited on its external faces on opposite sides of the internal multiple conductors and the entire element bends in response to the application of a potential difference between the electrodes, the direction of bending being dependent upon the sense of the applied voltage. "Multimorph" piezo-electric ceramic elements are available from Philips Industries Ltd.

The spoked rotor used in preferred embodiments of the present invention preferably has an even number of spokes spaced apart at equal angular intervals, alternate spokes being displaced in opposite directions symmetrically with respect to the said plane perpendicular to the rotor axis. The spoked rotor need not necessarily have such a symmetrical configuration, however, and in an alternative embodiment of the invention one or more of the spokes in such a rotor may be omitted, so that not all the spokes of the rotor are spaced apart at regular intervals. Such an asymmetric rotor can still be effective in certain embodiments of the invention, although in practice suitable counterweights would be embodied in or attached to such a rotor to balance it both statically and dynamically.

In a typical practical embodiment of the invention the "multimorph" bender element consists of an elongate ceramic strip having parallel flat faces on which silver electrodes are deposited, and formed with a number of continuous longitudinally extending holes extending throughout the length of the strip and coated internally with graphite to form the central internal conductors of the multimorph. Such a multimorph bender element has a lower natural frequency of oscillation than a "bimorph" bender element of the same length. For example, a typical multimorph element having a length of 70 mm would have a characteristic resonant frequency in the region of 70 Hz.

Since some multimorph bender elements have a fairly low Q, the oscillations of the element, and the drive to the rotor, may be maintained in practice despite variations in the frequency of the alternating drive voltage. This is an important consideration in the context of a synchronous mains-driven motor, where the frequency of the alternating current supply may vary within fairly wide limits (for example 48 − 52 Hz). To operate at resonance, even with a low Q multimorph, might require an impedance (such as a capacitor) in series with the multimorph to keep the amplitude of oscillation down to a reasonable level, such as 1 mm.

For use as a synchronous motor a multimorph bender element could be used having a natural frequency of oscillation equal to the alternating current mains frequency (for example 50 Hz). Such a multimorph element could in practice be driven direct from the mains provided the mains frequency does not vary more than ± 0.3%.

For use in a timepiece drive at an accurately maintained piezo-electric crystal derived frequency the bimorph or, multimorph bender element would be arranged so that its natural frequency of oscillation equalled that of a drive voltage (which may be alternating or pulsed) derived by frequency division from a crystal-controlled oscillator and constant to within 1 in $10^5$.

Whether employed in a mains-driven synchronous motor or in a crystal-controlled timepiece drive the multimorph element would be maintained in resonant oscillation at its natural frequency.

BRIEF DESCRIPTION OF THE DRAWINGS

Some practical embodiments of the present invention are illustrated, merely by way of example, in the accompanying drawings, in which:

FIG. 1 is a diagrammatic representation of part of an electrodynamic motor according to a first embodiment of the invention;

FIGS. 2 and 3 are similar diagrammatic views of parts of an electric motor respectively according to alternative embodiments of the invention, and FIG. 4 is a schematic illustration of a resonant piezoelectric motor according to another embodiment of the invention.

DETAILED DESCRIPTION OF THE ILLUSTRATED EMBODIMENTS

Corresponding component parts in the illustrated embodiments are designated by the same reference numerals.

Referring to FIG. 1, the rudimentary components of a motor according to the invention are illustrated. A cantilever-mounted oscillatory element 1 in the form of a metal strip or reed is anchored at one end and cooperates at its free end with a rotor 2 mounted on a spindle 3 for rotation about the axis of the latter. The rotor 2 is stabilised by a stabilizer disc 3' loosely mounted on the spindle 3 as known per se.

The rotor 2 is in this embodiment of a type well known per se, having on one or both faces a circumferential wavy magnetic track defined between inner and outer sets of radial spokes, angularly displaced relative to one another so that the inner spokes are radially aligned with the gaps between the outer spokes: the parts of the rotor interconnecting the two sets of spokes form, in effect, a continuous wavy magnetic track, the rotor itself being formed from a single piece of ferromagnetic material.

The free end of the oscillatory element 1 is free to oscillate in a direction perpendicular to the axis of the rotor 2 and a permanent magnet 4 is attached to this free end. The magnet 4 is of generally L-shaped configuration, having a first pole extending parallel to the axis of the rotor 2 and spaced by a short gap from the circumferential wavy magnetic track on the rotor disc, forming with the latter a magnetic coupling of a kind well known in the art of magnetic escapements. The other pole of the magnet 4 extends in a direction perpendicular to the rotor axis, and parallel to the direction of oscillation of the free end of the oscillatory element 1, and is located on the axis of a driving coil 5. The driving coil 5 is connected to a driving circuit (not shown)

which includes a crystal-controlled oscillator and a frequency-divider, such that the driving signals applied to the driving coil 5 have an accurately determined frequency which is substantially equal to the natural frequency of oscillation of the oscillatory element 1.

It has been found experimentally that the variation with the driving frequency of the power factor of the oscillatory drive imparted to the oscillatory element reaches a maximum at a frequency which is higher than the resonant frequency of the element. The significance of this is that, in order to ensure optimum efficiency of the drive to the rotor, the driving frequency should be lower than the natural frequency of the oscillatory element. More specifically, the driving frequency should be lower than the natural frequency by $f/2Q$, where $f$ is the driving frequency and Q is the Q-factor of the oscillatory member. By optimising the efficiency of the oscillatory drive in this way it is possible to ensure reliable self-starting and continuous rotation of the rotor.

For the purpose of the present specification the Q-factor is defined as follows: $Q = f_o/(f_1 - f_2)$, where $f_o$ is the natural (resonant) frequency of the element and $f_1, f_2$ are the frequencies above and below $f_o$ respectively at which the oscillation amplitude is $1/\sqrt{2}$ the amplitude at resonance for a given driving voltage; that is, $f_1 - f_2$ is the bandwidth of the oscillations.

Thus for example, if the natural frequency of the element 1 is 66 Hz and the element has a 'Q' of 16.5 the driving signals should have a frequency of 64 Hz, obtained for example by dividing-down a crystal-controlled frequency to 64KHz.

When the quartz crystal-derived signals are applied to the driving coil 5, the magnet 4 is oscillated in the direction of the axis of the coil 5, and in turn imparts resonant oscillations to the oscillatory element 1. The oscillation of the free end of the oscillatory element 1 causes the pole of the magnet 4 which cooperates with the rotor disc to oscillate in a generally radial direction with respect to the axis of the rotor, and by virtue of the wavy circumferential magnetic track on the rotor these oscillations in turn cause continuous rotation of the rotor 2, in a manner well known per se. Since the oscillations of the oscillatory element 1 driving the rotor 2 are accurately determined by a quartz crystal oscillator, the speed of rotation of the rotor 2 is accurately determined and remains constant, so that the rotary drive derived from the rotor 2 by suitable gearing connected to its spindle 3 is ideally suited for timepiece applications.

FIG. 2 illustrates an alternative embodiment of the invention in which the driving coil 5 forms part of an electromagnet having a core 6 which in turn cooperates with a part of the oscillatory element 1 intermediate its two ends, the oscillatory element 1 being in this case of ferromagnetic material, for example spring steel or of an alloy of zero thermo-elastic coefficient. The driving signals applied to the coil 5, derived directly from a quartz crystal oscillator as described in relation to FIG. 1, cause oscillations, synchronous with the driving signals, to be imparted to the element 1. In this embodiment the free end of the oscillatory element 1 carries a C-shaped magnet 4 having opposite pole pieces which face each other with parallel pole faces separated by a narrow gap through which the peripheral region of the rotor 2 moves, this gap being aligned with the mean line of the circumferential wavy magnetic track on the rotor 2.

FIG. 3 illustrates a third embodiment in which the free end of the oscillatory element 1 oscillates in a direction parallel to the axis of rotation of the rotor 2, the rotor in this instance having a peripheral wavy flux path formed by an air path defined by radial spokes 7 which are bent in alternate directions from a plane perpendicular to the rotor axis and corresponding to the mean position of the driving magnet 4. In this embodiment the driving magnet 4 is of L-shaped configuration, similar to that of FIG. 1, and itsend remote from the rotor 2 cooperates with a driving coil 5 to which frequency divided electrical signals from a quartz crystal oscillator are applied, as described previously, to induce resonant oscillations in the oscillatory element 1.

FIG. 4 illustrates purely schematically an embodiment of the invention in which the oscillatory element 1 comprises a cantilever ceramic element of the multimorph bender type having a magnetic coupling to a rotor 2. The multimorph bender element 1 is maintained in flexural oscillation by a quartz-crystal derived driving signal obtained from a crystal controlled oscillator 8 through a frequency divider 9, amplifier 10 and transformer 11. The transformer typically provides a sinusoidal driving voltage having an amplitude of 24 volts peak-to-peak, derived from a 1.5 volt dry cell used as the power source for the oscillator 8. The frequency of the sinusoidal driving voltage applied to the bender element is the same as the natural frequency of the bender element, or slightly lower than the latter frequency, as stated previously.

The crystal which determines the frequency of the oscillator 8 may be of quartz or other suitable piezoelectric crystal such as, for example, lithium tantalate.

In the practical example of the arrangement illustrated in FIG. 4 it will be supposed that the natural frequency of flexural oscillation of the element 1 is 128 Hz, subject to a natural variation of ± 3 Hz due to temperature and humidity variations and ageing of the material. The system should have a sufficiently low Q, in this case given by 128/6 = 21.3, to ensure that the oscillation amplitude does not fall appreciably (that is, below 70% of the amplitude at resonance) upon this variation of the frequency.

Now the ceramic element 1 will normally have a much higher Q than this, typically about 64, for the optimum conversion of electrical energy into mechanical energy, corresponding to a narrow bandwidth, typically ± 2 Hz, of frequency variation for maintained oscillation near resonance. By suitable dimensioning of the magnet 4 carried at the free end of the oscillatory element 1, and a suitable choice of the material for the rotor 2, the magnetic losses inherent in the coupling between the element 1 and the rotor 2 can in effect be adjusted, thereby adjusting the degree of damping of the oscillations and the overall Q factor of the system. In this way the Q of the system can be reduced to the desired value of 21.3, to ensure maintained resonant oscillations of the element 1 by the constant frequency quartz crystal derived driving signals despite shifts in the natural frequency of the element 1 of the order referred to.

It has been found that for optimum performance and efficiency the length of the magnet 4 should be less than six times the amplitude of oscillation of the magnet in use of the motor. Also, as shown purely diagrammatically, the cross sectional area of the magnet 4 should exceed the square of its length. Such a cylindrical magnet 4 could of course be employed in the embodiments illustrated in FIGS. 1 - 3.

The small bandwidth (typically ± 2 Hz) of the bender element presents no difficulty as regards the maintenance of a resonant driving signal, since the latter is derived by a frequency division from a quartz crystal oscillator, which is stable to ± 5 parts in $10^5$ over the temperature range - 40° C to + 80° C.

Some practical illustrations of suitable lossy magnetic materials for the rotor 2 are given below, where the power loss in watts per lb. is given for a frequency of 50 Hz at 5000 lines per square cm. peak magnetic flux density and a 0.010 inch thickness of material:

| Material: | Super Mumetal | Mumetal | Radiometal | Permendur |
|---|---|---|---|---|
| Power loss Watts/lb | 0.012 | 0.013 | 0.044 | 0.30 |

"Super Mumetal," "Mumetal," "Radiometal," and "Permendur" are all Registered Trade Marks.

In a typical example the weight of the rotor may be 0.10 gram, one quarter of which is magnetised to 5000 lines per square cm. peak. The power loss in a rotor made of Radiometal could therefore be 0.025/453 × 0.044 W = 2.42 μW. A typical driving signal power input to the motor would be 100 μW, so that the power loss introduced by the lossiness of the rotor material would be of the order of 2.4% for a rotor of Radiometal, 16% for a rotor of Permendur, or 0.66% for a rotor of Super Mumetal. If magnetic losses higher than 16% were required the rotor could be made of Silicon Iron or Mild Steel.

It will therefore be apparent that by a suitable choice of the magnetic material for the rotor the overall damping, and Q-factor, of the motor drive system can be adjusted to give a desired bandwidth of operation.

We claim:

1. An electric motor comprising a mechanically oscillatory element, a magnetic coupling cooperating with the oscillatory element, a rotor cooperating with the magnetic coupling, a permanent magnet carried by the oscillatory element, a driving coil interacting with said permanent magnet, and means for supplying to the driving coil signals to effect oscillation of the oscillatory element and thereby impart continuous rotation to the rotor through said magnetic coupling, said permanent magnet having a cross sectional area exceeding the square of its length.

2. The electric motor defined in claim 1, wherein the electrical driving signals have a frequency $f$ which is substantially $f/2Q$ less than the natural resonant frequency of the oscillatory element, that is, the frequency corresponding to maximum oscillation amplitude, where Q is the Q-factor of the oscillatory element.

3. The electric motor defined in claim 2, wherein the driving signal generating means comprise a piezoelectric crystal oscillator and means for dividing down the frequency of the output signals of said oscillator to provide said electrical driving signals.

4. The motor defined in claim 1, wherein the rotor has a number of spokes the outer ends of which are displaced in opposite directions from a plane perpendicular to the rotor axis.

5. The motor defined in claim 4, wherein the rotor has an even number of spokes spaced apart at equal angular intervals, alternate spokes being displaced in opposite directions symmetrically with respect to the said plane.

6. The motor defined in claim 1, wherein the material of the rotor is chosen that the magnetic damping of the oscillations of the element caused by the magnetic power loss characteristics of the rotor material gives an overall damping or Q-factor for the oscillations of the oscillatory element such as to ensure maintained resonant oscillations of the element despite changes in the resonant frequency of the element due to ambient conditions.

7. The motor defined in claim 1, including a stabiliser disc freely mounted on the spindle of the rotor.

8. The motor defined in claim 1, wherein the driving signal generating means comprise an oscillator having a frequency of at least 5 KHz and means for dividing down said frequency to provide said driving signals of frequency $f$.

9. The motor defined in claim 1, wherein the oscillatory element is a cantilever element anchored at one end, the magnetic coupling comprising at least one magnetic member carried at the free end of the oscillatory element and cooperating with a circumferential wavy magnetic flux path defined by the rotor.

10. The motor defined in claim 9, wherein said at least one magnetic member at the free end of the cantilever oscillatory element is constituted by one pole of the permanent magnet, another pole of said permanent magnet cooperating with the driving coil to which the electrical signals are applied to drive the oscillatory element.

11. The motor defined in claim 9, wherein the driving coil cooperates with a part of the oscillatory element intermediate the ends of the latter, the said electrical driving signals being applied to the driving coil to cause electromagnetically induced oscillations of the said element.

12. The motor defined in claim 9, wherein the length of the permanent magnet is less than six times the amplitude of oscillation of the magnet upon oscillation of the cantilever element.

13. The motor defined in claim 9, wherein the magnetic member is constituted by the permanent magnet and is carried at the free end of the oscillatory cantilever element.

* * * * *